Figure 1:
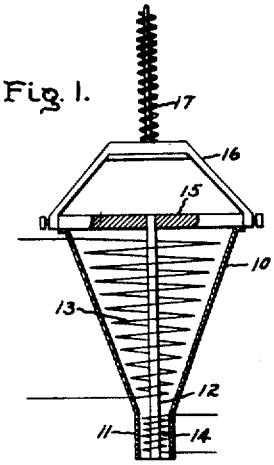

324-222 SR
OR RE 18,889 BEST AVAILABLE COPY
Search Room

J. A. SAMS ET AL

July 4, 1933. Re. 18,889

METHOD AND APPARATUS FOR TESTING METALS of Orig. 1,789,196

Original Filed Feb. 5, 1925 2 Sheets-Sheet 1

Inventors
James A. Sams
Virgil F. Shaw
by Alexander S. Lent
Their Attorney

176. ELECTRICITY GEN'L. APPL'NS
Search Room

J. A. SAMS ET AL

July 4, 1933. Re. 18,889

METHOD AND APPARATUS FOR TESTING METALS

Original Filed Feb. 5, 1925 2 Sheets-Sheet 2

Inventors
James A. Sams
Virgil F. Shaw
by Alexander S. Lunt
Their Attorney

175 ELECTRICITY ELEC. APPL'NS
Search Room

Reissued July 4, 1933

Re. 18,889

UNITED STATES PATENT OFFICE

JAMES A. SAMS, OF SCHENECTADY, AND VIRGIL F. SHAW, OF SCOTIA, NEW YORK, ASSIGNORS TO GENERAL ELECTRIC COMPANY, A CORPORATION OF NEW YORK

METHOD AND APPARATUS FOR TESTING METALS

Original No. 1,789,196, dated January 13, 1931, Serial No. 7,107, filed February 5, 1925. Application for reissue filed December 23, 1931. Serial No. 582,887.

Our invention relates to a method and apparatus for testing magnetic bodies such for example as steel cutting tools to determine their serviceability.

Steels are generally tested with a view to determining their suitability for some specific purpose; for example, the suitability of a steel cutting tool for continuous service depends upon such properties as its resistance to wear and shock, its elasticity and brittleness, its grain structure, the effect of heat treatment and its chemical composition. These properties are largely interdependent and it is therefore possible to approximately predict the serviceability of a particular piece of steel for a given purpose by the determination of the characteristics of some one of its properties such as the magnetic property.

Steel has been tested by determining its chemical composition. Such test requires appreciable time, destroys the part tested and does not take into consideration the condition of the material due to heat treatment. Steel has also been tested by the scleroscope, an instrument for dropping a hardened point upon the specimen and noting the rebound, and by the Brinell method, which is carried out by measuring the depth or diameter of an impression made in the material under test by a test ball under pressure. Such tests are also more or less destructive and are only indicative of surface conditions.

We have discovered that the reaction of steel to magnetism is also indicative of its properties and that this reaction when properly applied and controlled, may be used to determine the serviceability of such material to a high degree of accuracy and our invention relates to a method of and apparatus for the practicable application of this principle to the testing of magnetic materials.

In carrying our invention into effect, we subject the material under test to sudden or cyclic changes in magnetic flux such as an alternating magnetic field and obtain a comparative measurement of the so-called iron losses which occur in the material when thus magnetized.

Figure 2:
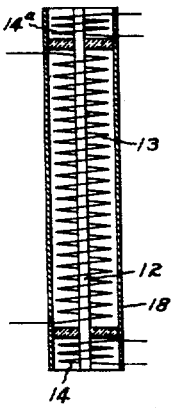
Figure 3:
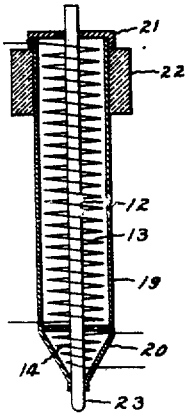
Figure 4:
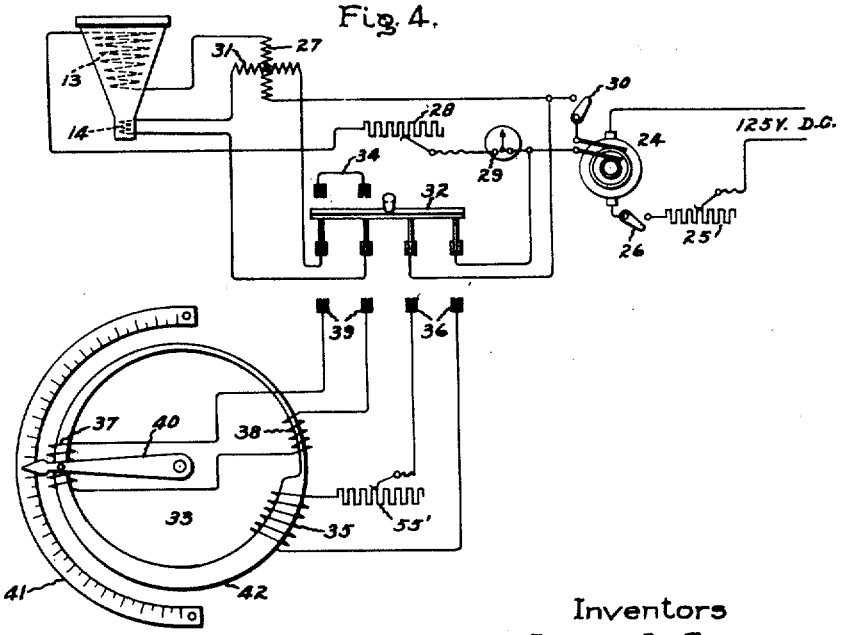
Figure 9:
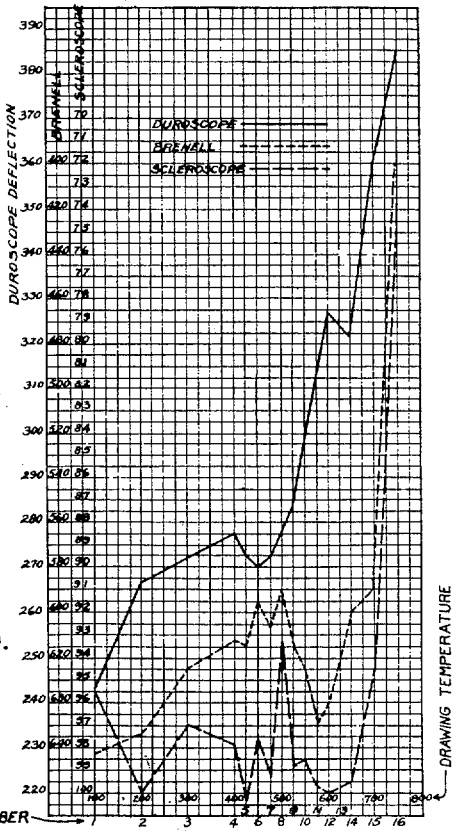
Figure 10:
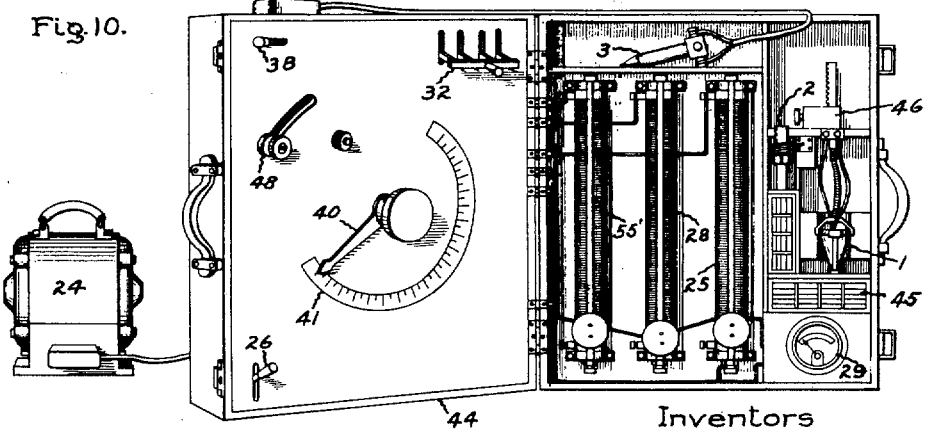

The features of our invention which are believed to be novel and patentable will be pointed out in the claims appended hereto. For a better understanding of our invention, reference is made in the following description to the accompanying drawings in which Figs. 1, 2 and 3 are schematic representations of different test units developed in accordance with our invention, Fig. 4 is a wiring diagram showing how the apparatus may be connected for testing purposes. Figs. 5 to 8 inclusive are hysteresis loops taken from our magnetic tester under different conditions. Fig. 9 shows by means of curves a comparison of the test results obtained by our method and other methods and Fig. 10 represents a portable test outfit embodying our invention as actually constructed.

The apparatus which we have found best suited for carrying out our invention consists in general of a sensitive wattmeter and a magnetic test unit which we have chosen to call the duroscope and which comprises a magnetic structure having a magnetizing coil and a potential coil arranged so that the piece of material to be tested may be magnetized by this magnet and the resulting effect of the magnetization determined. The magnetizing coil and potential coil are respectively connected so as to influence the current and potential coils of the wattmeter and the comparative readings of the wattmeter, with and without the test piece in place, may be taken as an indication of the quality of serviceability of the test piece.

A suitable source of alternating current supply is preferable for producing an alternating flux field, although a direct current source with means for interrupting or reversing its circuit may also be employed. Various regulating and calibrating devices are desirable. In practice, it has sometimes been found advantageous to compensate the wattmeter and duroscope circuits so that the wattmeter reads zero when the test piece is omitted from the duroscope, place the duroscope on the test piece so that the latter is magnetized thereby, adjust the circuits to bring the wattmeter deflection back to zero and use the position of the circuit adjusting means as an indication for the serviceability of the test piece. This may be called the null method of test in analogy to the generally known null method of galvanometer tests. To those who are familiar with the use of the galvanometer as used in the testing laboratory, it will be evident that there are various ways of carrying out the test as thus outlined. Consequently, we do not wish to limit our invention to the particular apparatus or procedure hereinafter specifically described.

Figs. 1 to 3 illustrate different test units or duroscopes which will first be described. Fig. 1 shows a cone shaped soft iron shell 10 which instead of coming to a point at its small end, terminates in a cylindrical portion 11. Through the axis of this cone shaped shell is a soft iron core piece 12. Around the core piece in the main portion of the cone is wound a magnetizing coil 13 and around the core in the small cylindrical portion 11 is wound a potential coil 14. The magnetic circuit between the core and shell at the large end of the cone is closed by a soft iron member 15. The magnetic circuit at the small cylindrical end of the device is arranged to concentrate the flux to a small area and is adapted to be closed by the piece of material to be tested when the test unit is placed on a flat surface of such material. The device is preferably arranged to be adjustably supported above the material to be tested by a bail 16 and a spring 17. The device may be made of any convenient size but generally need not be greater than 3 inches in maximum diameter.

It will be apparent that there will be some transformer action between the magnetizing and potential coils when the former is energized with an alternating current, which transformer action will be greatly increased when a test piece of magnetic material forms an armature across the concentric pole pieces adjacent the potential coil. It will also be apparent that the nature and magnitude of this transformer action in the latter case will vary with the magnetic nature of the test piece. These differences will show up when the magnetizing and potential coils are respectively connected to influence the current and potential coils of a wattmeter.

In Fig. 2 we have shown a tester in a cylindrical form having a magnetizing coil 13 and two potential coils 14 and 14*a* at opposite ends, all wound around the central core 12, in the cylindrical shell 18. This tester is adapted for comparing a standard sample which is placed over one end with an unknown sample which is placed over the other end. The two potential coils may be connected to oppose each other and in series with the potential coil of the wattmeter.

The test units of Figs. 1 and 2 are adapted for testing pieces having flat surfaces.

In Fig. 3 we have shown a test unit for testing pieces having irregular surfaces. In this unit, we have the central core piece 12 about which is wound the magnetizing coil 13 and the potential coil 14. The shell 19 about the magnetizing coil is cylindrical except that portion about the potential coil which is cone shaped, as represented at 20. The upper end of the magnetic circuit is closed by a magnetic bridge member 21 and the lower end of the circuit is substantially closed by the cone shaped member 20. A holder and terminal block 22 is provided. With this test unit it will appear that the transformer action will be increased when the rounded point of the extension 23 of the central core member is placed on a magnetizable object.

In Fig. 4 we have represented a wiring diagram together with circuit adjusting means suitable for use with our magnetic tester. In this figure, 24 represents a source of alternating current supply. In this instance we have represented a rotary converter with resistance means 25 for adjusting the direct current supply so as to vary the frequency of the alternating current end. The direct current circuit of the rotary converter includes the control switch 26 shown open. The current coil 27 of the wattmeter and the magnetizing coil 13 of the magnetic test unit are connected in series through an adjusting resistance 28, an ammeter 29, and a control switch 30 to the alternating current end of the rotary converter. The potential coil 31 of the wattmeter is connected in series with the potential coil 14 of the magnetic test unit, which unit is represented as that shown in Fig. 1. A multiple double throw switch 32 is provided which is used in connection with an adjustable transformer 33 when the null method of test is employed. When the switch 32 is thrown up, the potential circuit between the wattmeter and the test unit is closed through the connection 34.

In testing a piece of material with the circuits thus arranged, the frequency generated by the rotary converter is first adjusted to the value for which the apparatus has been calibrated by means of the rheostat 25. The switch 30 is closed and the rheostat 28 adjusted until the ammeter 29 shows a current value for which the apparatus has been calibrated. A wattmeter reading is then taken. There being no test piece adjacent the potential coil 14, the wattmeter reading will be a certain amount which will be the same whenever these same conditions of the test circuit are reproduced. The material to be tested is placed across the concentric pole pieces of the tester adjacent the potential coil 14. When this occurs, the transformer action is increased and there also occurs a shifting of the phase angle between the magnetizing and potential currents. This shifting of phase is due to the

ELECTRICAL APPLNS
183 so-called iron losses in the material being tested. It is known for example that hard steel has a considerable hysteresis loss. A certain amount of eddy current flux loss is also included. This change in condition results in a new deflection of the wattmeter. The magnitude of the wattmeter deflection will vary with the hardness of the steel tested and may thus be calibrated with various samples of known hardness and thereafter used to indicate the hardness of unknown test pieces. The flux penetrates to an appreciable extent into the body of the test piece so that the indication is not merely of the surface hardness of the material, but also for an appreciable distance beneath the surface. The test piece may of course be moved along adjacent the test coil and tests made every few inches with considerable rapidity, the variations of the wattmeter indication, if any, indicating the different degrees of hardness.

In some cases the null method of test is desirable, in which case the switch 32 of Fig. 4 is thrown down. The frequency and current is adjusted to that for which the apparatus is calibrated as before. Current is also supplied from the rotary converter to the primary winding 35 of the adjustable inductance device or transformer 33 through the switch contacts 36 and adjusting resistance 55′. The secondary winding of this inductance device is made up of two coils 37 and 38 connected in series with the potential circuit through switch contacts 39.

The core 42 of the transformer varies in cross-section, the primary winding 35 being wound about the largest section. The secondary coil 38 is stationary and is wound about the smallest section of the core. The greater arc of the core between coils 38 and 35 gradually increases in cross-section and the coil 37 is movable about this portion of the core by means of an arm 40 to which the coil 37 is suitably secured. When coil 37 is close to coil 35 on the larger part of the core, the transformer action is a maximum and gradually diminshes as the movable coil is moved about the gradually diminishing section of the core. The potential thus induced in coils 37 and 38 is opposed to that induced by the magnetizing coil 13 in the potential coil 14, and by varying the current in coil 35 and the position of coil 37, the wattmeter reading may be brought to zero both before and after the magnetic test piece is in place. The arm 40 carries a pointer cooperating with a scale 41 which is suitably calibrated in terms of hardness or durability. In practice, the pointer is set at a zero reference point of the scale and the current in coil 35 adjusted to bring the wattmeter deflection to zero with no test piece adjacent the potential coil 14. Then the test piece is placed in testing position and the secondary coil 37 is adjusted until a zero reading of the wattmeter is again obtained. The hardness is then indicated by the position of pointer 40 in scale 41. The null method has the advantage that variations in the voltage and frequency of the alternating current supply affect both the compensating circuit and the main test circuit alike so that errors due to such variations are eliminated.

In order that a better understanding may be had of the invention, reference is made to Figs. 5 to 8 inclusive. These figures represent hysteresis loops obtained from our testing unit shown in Fig. 2 under different conditions and taken by a cathode ray oscillograph. The sensitivity of the apparatus was greatly diminished for these tests.

Figure 5:
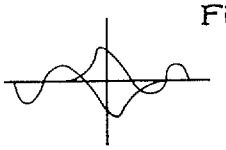
Figure 6:
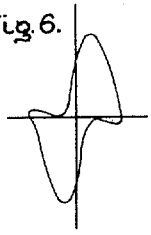

Fig. 5 represents the hysteresis loop with no test specimen adjacent the potential coils and shows that the circuit is compensated to obtain a zero wattmeter deflection. Fig. 6 represents a hysteresis loop with the same adjustment of the circuit as in Fig. 5, but with a hard steel test piece in testing position at one end only.

Figure 7:
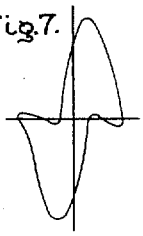
Figure 8:
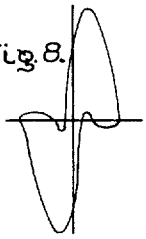

Fig. 7 represents a similar loop for a normal steel test piece and Fig. 8 for a soft steel test piece. These loops show that the permeability of the soft steel is greater than that of the harder steel but that for a given flux density, the hysteresis loss of the harder steel is greater. The soft steel due to the greater permeability has the higher losses for the excitation used and will give the greater wattmeter deflection. From this it will be observed that instead of an ordinary wattmeter we could use a cathode ray oscillograph. The wattmeter however is sufficiently sensitive and is much less cumbersome to use.

During the calibration of our apparatus, a number of steel samples of different degrees of hardness were carefully prepared. These samples consisted of high speed steel pieces which were quenched at 1300° C. and drawn at various temperatures to vary their hardness. They were tested by the Brinell, scleroscope and the method invented by applicants with the following results:

| Sample No. | Temperature in degrees C. drawn | Brinell | Scleroscope | Applicants' duroscope |
|---|---|---|---|---|
| 1 | 100 | 642 | 95.68 | 243. |
| 2 | 200 | 637 | 100. | 266.5 |
| 3 | 300 | 622 | 96.87 | 272. |
| 4 | 400 | 612 | 97.87 | 278 |
| 5 | 425 | 614 | 100.37 | 272.5 |
| 6 | 450 | 595 | 97.62 | 270 |
| 7 | 475 | 608 | 99.25 | 272 |
| 8 | 500 | 591 | 93.25 | 278 |
| 9 | 525 | 615 | 98.75 | 285 |
| 10 | 550 | 622 | 98.56 | 297 |
| 11 | 575 | 635 | 99.75 | 312.5 |
| 12 | 600 | 631 | 100.0 | 327 |
| 13 | 625 | 608 | 98.50 | 325 |
| 14 | 650 | 601 | 99.43 | 322 |
| 15 | 700 | 590 | 94.62 | 360 |
| 16 | 750 | 400 | 73.87 | 385 |

The comparative results of these tests are shown plotted in Fig. 9 and illustrate the greater uniformity and accuracy of appli-

BEST AVAILABLE COPY cants' method of test. At a drawing temperature of about 600° C. occurs what is known in the steel industry as the critical point and where a decided change in the physical structure of the steel takes place. With the Brinell and scleroscope methods of test, particularly unsatisfactory results are invariably obtained at this point probably due to the fact that these tests are essentially surface tests.

We have also determined by experiments that variations in the strain of steel may be detected by our apparatus. For example, we have found that a given steel sample will give a certain wattmeter deflection when in the unstrained condition, but that if the piece is compressed, the wattmeter deflection will increase appreciably and that the increased deflection is proportional to the compression strain and that the test can be reproduced with fairly uniform results. It is believed that this feature will prove to be of considerable value in testing steel structures under strain to determine their factor of safety.

The apparatus which we have described may be put up in portable form so as to be carried about and the test carried out wherever electric energy is available. In places where electric energy is not available a suitable storage battery may be included in the apparatus. One such portable set as actually constructed is shown in Fig. 10 where the relative size of the various parts may be seen. The control resistances 25, 28 and 55′ and the ammeter 29 are contained in the cover of a carrying case 44 shown open. Compartments are also provided in the cover for the three types of test units 1, 2 and 3 which correspond to the test units shown in Figs. 1, 2 and 3 respectively. A number of standard samples of steel are shown at 45. An adjustable support for the test unit 1 is shown at 46. The portable wattmeter 47 shown resting on the top of the case may also be housed in the cover of the case. The adjustable transformer is housed in the base portion of the case with the arm 40 and scale 41 exposed when the case is open. The handle shown at 48 is that of a reversing switch for the transformer potential circuit and the handles for the control switches 26, 32 and 38 are indicated by corresponding reference numerals. The rotary converter 24 is provided with a carrying handle like those of the case so that the entire apparatus may be carried about by one person. The various circuit connections between the interior and exterior of the case are preferably carried through detachable plug switches, not shown, in the rear wall of the case.

In accordance with the provisions of the patent statutes, we have described the principle of operation of our invention, together with the apparatus which we now consider to represent the best embodiment thereof; but we desire to have it understood that the apparatus shown and described is only illustrative and that the invention can be carried out by other means.

What we claim as new and desire to secure by Letters Patent of the United States, is:

1. Apparatus for determining physical properties of magnetizable materials comprising a magnetic tester, having magnetizing and secondary coils, an electrical measuring instrument having current and potential coils connected in series with said magnetizing and secondary coils respectively, a potential transformer, a common source of alternating current for energizing the said transformer and said magnetizing coil, means for connecting the secondary winding of said transformer in series opposition with the secondary coil of said magnetic tester, means for adjusting the secondary voltage of said potential transformer and indicating means associated with said adjusting means graduated to indicate a physical property characteristic of the material to be tested.

2. A magnetic testing device comprising a magnetic core member, a magnetizing coil wound about the body of said core, a potential coil wound about said core adjacent one end, and a magnetic shell concentrically enclosing said coils, said shell being reduced adjacent the potential coil for concentrating the flux of the device to a small area thereat, the potential coil end of said device being designed to be placed against the object to be tested substantially as and for the purpose set forth.

3. A magnetic testing device comprising a magnetic core member, a magnetizing coil wound about the body portion of said core member, a potential coil wound about said core member adjacent one end, a magnetic shell concentrically enclosing said coils, the shell being reduced adjacent the potential coil end to concentrate the flux of the device to a small area thereat, and a magnetic member connecting said core and shell at the opposite end, the core at the potential end of the device being extended beyond the shell and shaped to make substantially a joint contact with the material to be tested.

4. A magnetic testing device comprising a magnetic core member, a magnetizing coil wound about the body of said core, a potential coil wound about said core adjacent one end, and a magnetic shell consisting of a cone-shaped portion surrounding said magnetizing coil and a cylindrical portion surrounding said potential coil, the potential coil end of said device being designed to be placed against the object to be tested substantially as and for the purpose set forth.

5. A magnetic testing device comprising a magnetic core member, a magnetizing coil wound about the body portion of said core member, a potential coil wound about said ELECTRICITY, GENL. APPL'NS
BEST AVAILABLE COPY
Search Room core member adjacent one end, a magnetic shell consisting of a cone-shaped portion surrounding said magnetizing coil and a cylindrical portion surrounding said potential coil, the cylindrical portion of said shell being a continuation of the small end of the cone-shaped portion, and a magnetic member connecting said core and shell at the large end of the cone-shaped portion of said shell, the cylindrical end of said device being designed to be placed against the object to be tested substantially as and for the purpose set forth.

6. The method of testing a magnetizable body which includes simultaneously establishing a magnetic flux in a standard of known magnetism affecting properties and in said body respectively by means of a magnetic force and producing for inspection a representation of the instantaneous value variations of a cycle unit of the current produced by a difference in said magnetic fluxes due to a difference in a magnetism affecting property of said standard and said body.

7. The method of testing a magnetizable body which includes simultaneously establishing a magnetic flux in a standard of known magnetism affecting properties and in said body respectively by means of a magnetic force, and producing a continuous representation of instantaneous value variations in successive cycles of the differential current produced by a difference in said magnetic fluxes due to a difference in a magnetism affecting property of staid standard and said body.

8. The method of testing a magnetizable body which includes simultaneously establishing a magnetic flux in a standard of known magnetism affecting properties and in said body respectively by means of a magnetic force, effecting relative movement between said standard and said body and producing for inspection a representation of successive instantaneous value variations of the current produced by a difference in said magnetic fluxes due to a difference in a magnetism affecting property of said standard and different portions of said body.

9. The method of testing a magnetizable body which includes producing a wave form image of the current induced in the secondary of a transformer with said standard positioned in the effective field thereof, producing a wave form image of the current induced in the secondary of said transformer with said magnetizable body positioned in the effective field thereof, and comparing said wave form images.

10. The method of testing which includes subjecting a specimen to a magnetizing force in a transformer, producing a representation of the relationship between instantaneous values of current induced in the secondary circuit of the transformer while the specimen is in the effective magnetic field thereof, subjecting the specimen to inspection for determination of its physical and/or chemical properties, co-relating said representation with the results of said inspection, subjecting another specimen in a transformer to a magnetizing force having the same value and characteristics as those of the magnetizing force to which the first specimen was subjected, and comparing the representation of the relationship between instantaneous values of current induced in the secondary circuit of the transformer while the second specimen is in the effective field thereof with said first mentioned representations to determine the likeness or unlikeness of said specimens.

In witness whereof, we have hereunto set our hands.

JAMES A. SAMS.
VIRGIL F. SHAW.